United States Patent
Chan et al.

(10) Patent No.: US 8,459,627 B2
(45) Date of Patent: Jun. 11, 2013

(54) APR PLATE CLAMPING DEVICE

(75) Inventors: Chin-Tsai Chan, Taoyuan County (TW); Chiang-Che Chang, Kaohsiung (TW); Shen-You Yeh, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 251 days.

(21) Appl. No.: 13/099,366

(22) Filed: May 3, 2011

(65) Prior Publication Data

US 2012/0223203 A1    Sep. 6, 2012

(30) Foreign Application Priority Data

Mar. 4, 2011   (TW) .............................. 100203807 U (51) Int. Cl.
*F16B 2/06* (2006.01)
(52) U.S. Cl.
USPC ............. 269/287; 269/902; 269/909; 269/47; 269/54.4; 349/58
(58) Field of Classification Search
USPC ........... 248/309.2, 313, 316.1, 316.6; 269/16, 269/265, 266, 287, 291, 294, 295, 303, 47, 269/53, 54, 54.4, 902, 909; 349/58; 451/365; 72/422
See application file for complete search history.

(56) References Cited

U.S. PATENT DOCUMENTS

| | | | | |
|---|---|---|---|---|
| 1,232,628 A * | 7/1917 | Van Berkel | .................. | 269/54.4 |
| 1,396,162 A * | 11/1921 | Campbell et al. | ............... | 269/37 |
| 1,746,529 A * | 2/1930 | Haines | ......................... | 269/87.1 |
| 2,457,811 A * | 1/1949 | Emrich | ........................... | 15/268 |
| 2,668,568 A * | 2/1954 | Budd | ......................... | 144/135.2 |
| 2,831,522 A * | 4/1958 | La Vista | ......................... | 72/401 |
| 3,168,954 A * | 2/1965 | Von Herrmann | ............... | 211/50 |
| 3,827,279 A * | 8/1974 | Buske | ............... | 72/457 |
| 3,899,164 A * | 8/1975 | Newman | ........................ | 269/71 |
| 4,037,456 A * | 7/1977 | Jarman | ......................... | 72/325 |
| 4,457,159 A * | 7/1984 | Jarman et al. | .................. | 72/422 |
| 4,899,974 A * | 2/1990 | Wear et al. | ................... | 248/467 |
| 4,915,367 A * | 4/1990 | Carossino | ..................... | 269/101 |
| 5,172,896 A * | 12/1992 | Beere | ............................ | 269/252 |
| 5,467,972 A * | 11/1995 | Lee et al. | ...................... | 269/118 |
| 5,799,404 A * | 9/1998 | Payne | ............................ | 33/370 |
| 6,342,138 B1 * | 1/2002 | Brown | ..................... | 204/297.09 |
| 6,453,518 B1 * | 9/2002 | Adams et al. | ................... | 24/67.9 |
| 6,554,265 B2 * | 4/2003 | Andronica | ..................... | 269/268 |
| 7,789,352 B2 * | 9/2010 | Darling, III | .................. | 248/74.4 |
| 2003/0155478 A1 * | 8/2003 | Easterling | .................. | 248/316.1 |
| 2005/0029416 A1 * | 2/2005 | Buck et al. | ..................... | 248/200 |
| 2005/0056756 A1 * | 3/2005 | Wang | ......................... | 248/316.1 |
| 2009/0200443 A1 * | 8/2009 | Burtscher et al. | .......... | 248/316.1 |

FOREIGN PATENT DOCUMENTS

DE    4029621 A *   5/1991

* cited by examiner

*Primary Examiner* — Lee D Wilson
*Assistant Examiner* — Tyrone V Hall, Jr.
(74) *Attorney, Agent, or Firm* — Winston Hsu; Scott Margo (57) ABSTRACT

A strip-shaped protrusion and a corresponding strip-shaped groove are respectively configured at a first holder and a second holder of an APR plate device, such that as an APR plate is clamped by the first holder and the second holder via their clamping surfaces, the strip-shaped protrusion and the strip-shaped groove further push and slightly deform the APR plate for enhancement of the clamping toward the APR plate, thereby preventing problems of buckling or tearing of the APR plate due to insufficient clamping force of the holders.

7 Claims, 13 Drawing Sheets

APR PLATE CLAMPING DEVICE

BACKGROUND OF THE INVENTION

1. Field of the Invention

The invention relates to an APR plate device, and more particularly, to an APR plate device with modified holders.

2. Description of the Prior Art

During the process of manufacturing an LCD panel, the coating of polyimide (PI) of a panel cell is carried out by using an APR plate rolling over with the roller. In tool machines like a transfer machine of APR plate or a cleaning machine of APR plate, the APR plate is clamped with its two ends by the holders and should remain smoothness and precise positioning during the clamping.

Figure 1:
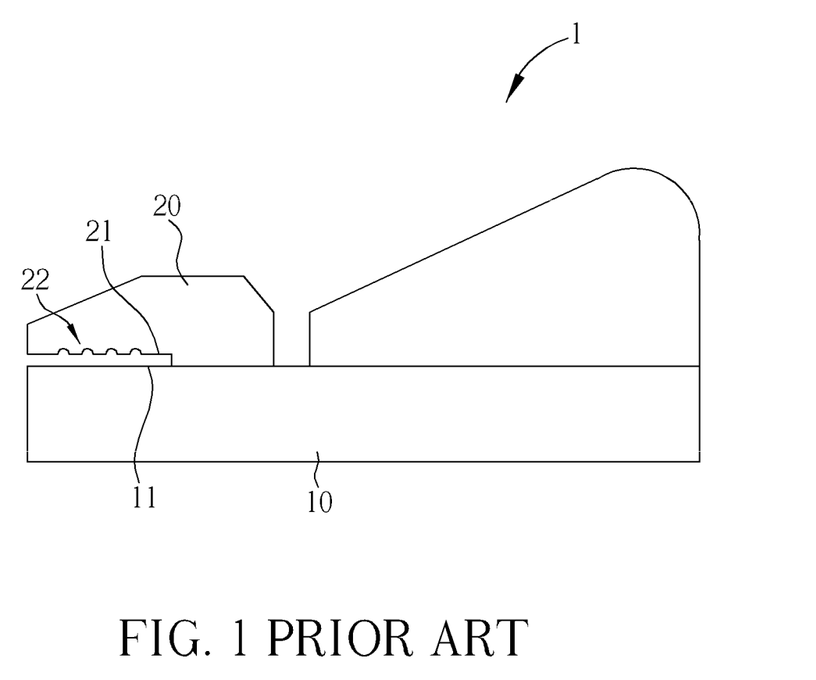
FIG. 1 is a schematic diagram showing the lateral cross-sectional view of a holder of an APR plate device according to the prior art.

However, the APR plate is easy to crack because of the conventional clamping mechanism. Please refer to FIG. 1. FIG. 1 is a schematic diagram showing the lateral cross-sectional view of a holder 1 of an APR plate device according to the prior art. The holder 1 includes an upper holder 20 and a lower holder 10. The lower clamping surface 11 of the lower holder 10 and the upper clamping surface 21 of the upper holder 20 form a gap to accommodate and holding an end of an APR plate. The lower clamping surface 11 is a smooth flat surface, while the upper clamping surface 21 includes a plurality of long and thin male-and-female faces 22, which can be used, together with the lower clamping surface 11, for clamping the APR plate. The APR plate is two soft plates combined together and is pulled and stretched by the roller or its own weight. As the upper holder 20 and the lower holder 10 are holding an end of the APR plate, a small gap between the two holders 20, 10 may easily generate a shear force onto the APR plate and crack the end of the APR plate. A large gap between the two holders 20, 10, on the other hand, will reduce the clamping ability to the APR plate, which will suffer a stretching stress by its own weight of the pulling force of the roller. Under such condition, the two soft plates of the APR plate tend to buckle and are torn apart. The positioning opening where a positioning element is passing through may crack due to stress concentration. Once crack happens to one positioning opening, the other openings will successively crack.

SUMMARY OF THE INVENTION

The invention provides an APR plate device. The APR plate device includes a first holder, a second holder, and a plurality of positioning elements. The first holder includes a first clamping surface, a strip-shaped groove, and a plurality of positioning indentations. The strip-shaped groove locates at the first clamping surface. The plurality of positioning indentations locates at the strip-shaped groove. The second holder is utilized for assembling with the first holder and a gap is formed therebetween. The second holder includes a second clamping surface and a strip-shaped protrusion, which protrudes from the second clamping surface and corresponds to and extends toward the groove when the first holder and the second holder are assembled together. Each of the plurality of positioning elements is mounted to a corresponding one of the positioning indentations and protruding out of the strip-shaped groove. After the second holder is assembled with the first holder and the gap is formed therebetween, an end of an APR plate may be used to extend into the gap for being abutted and clamped with the end's two sides by the first clamping surface and the second clamping surface respectively. The strip-shaped protrusion is utilized for abutting against and deforming the end of the APR plate to clamp the end of the APR plate along a direction of the extension of the strip-shaped protrusion. The end of the APR plate includes a plurality of positioning holes for corresponding to the plurality of positioning elements respectively.

When the APR plate device is holding an APR plate, the cooperated strip-shaped groove and protrusion of the first holder and the second holder slightly deform the clamped end of the APR plate so as to provide a steady and strong clamping ability, which effectively prevents shear effect due to small gap or buckling to crack due to large gap between the two holders.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
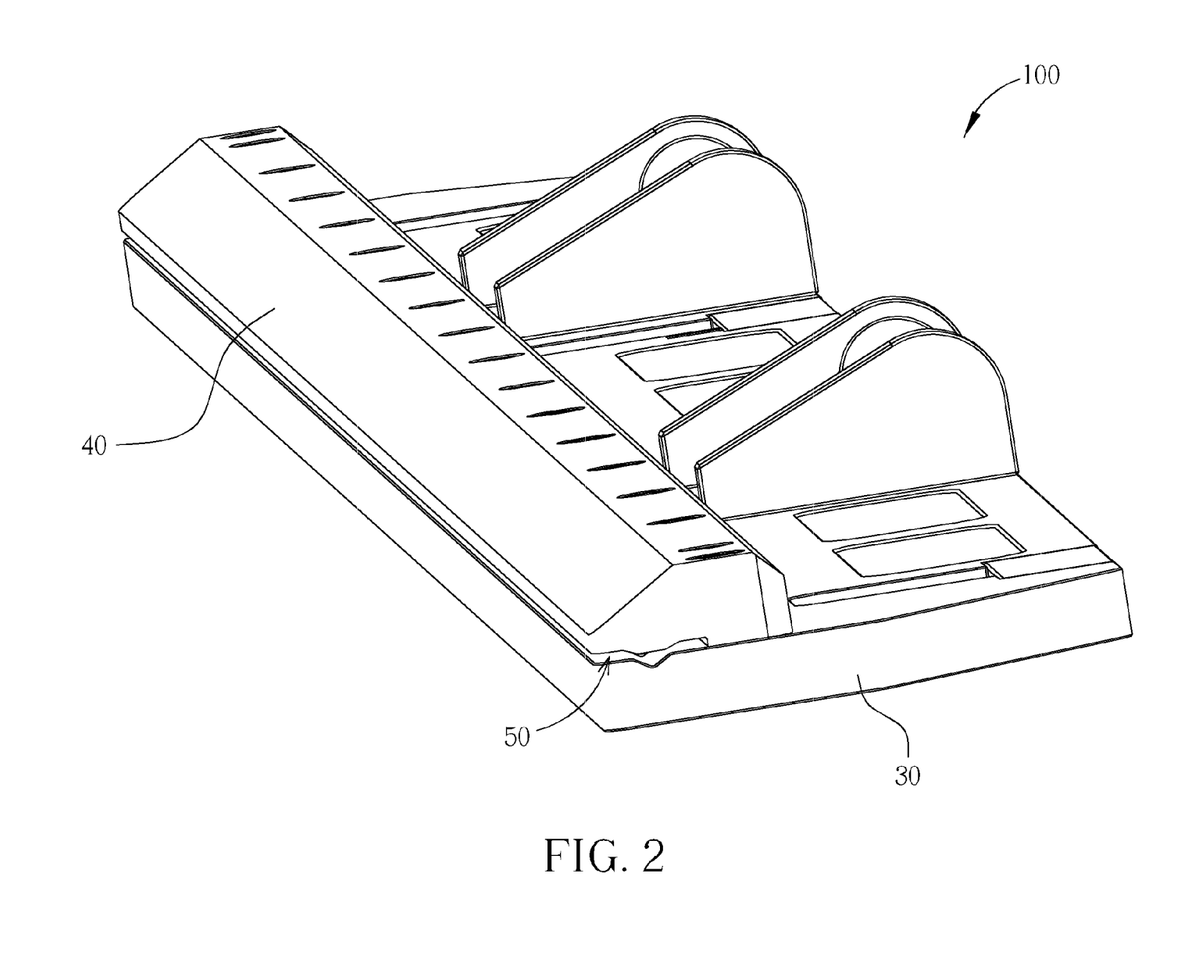
FIG. 2 is a schematic diagram of an APR plate device showing its holders according to the invention.

Please refer to FIG. 2. FIG. 2 is a schematic diagram of an APR plate device 100 showing its holders. The APR plate device 100 can be a transfer machine of APR plate, a cleaning machine of APR plate, or any machinery that is used to hold an APR plate in the procedure of coating polyimide of LCD panel. In the embodiments of the invention, only holders of the APR plate device 100 that are used for clamping the APR plate are shown in the figures, while the rest components of the APR plate device 100 are not shown in the figures, which form the knowledge easily acquirable for any person skilled in the art and are omitted herein.

The APR plate device 100 includes a first holder 30 (the lower holder) and a second holder 40 (the upper holder). The first holder 30 and the second holder 40 assemble with each other to form a holding mechanism as shown in FIG. 2. A gap 50 is formed between the first holder 30 and the second holder 40 for accommodate an end of the APR plate (referring to FIG. 13), where the width of the gap 50 approximately equals to the thickness of the APR plate to provide good clamping for the APR plate.

Figure 3:
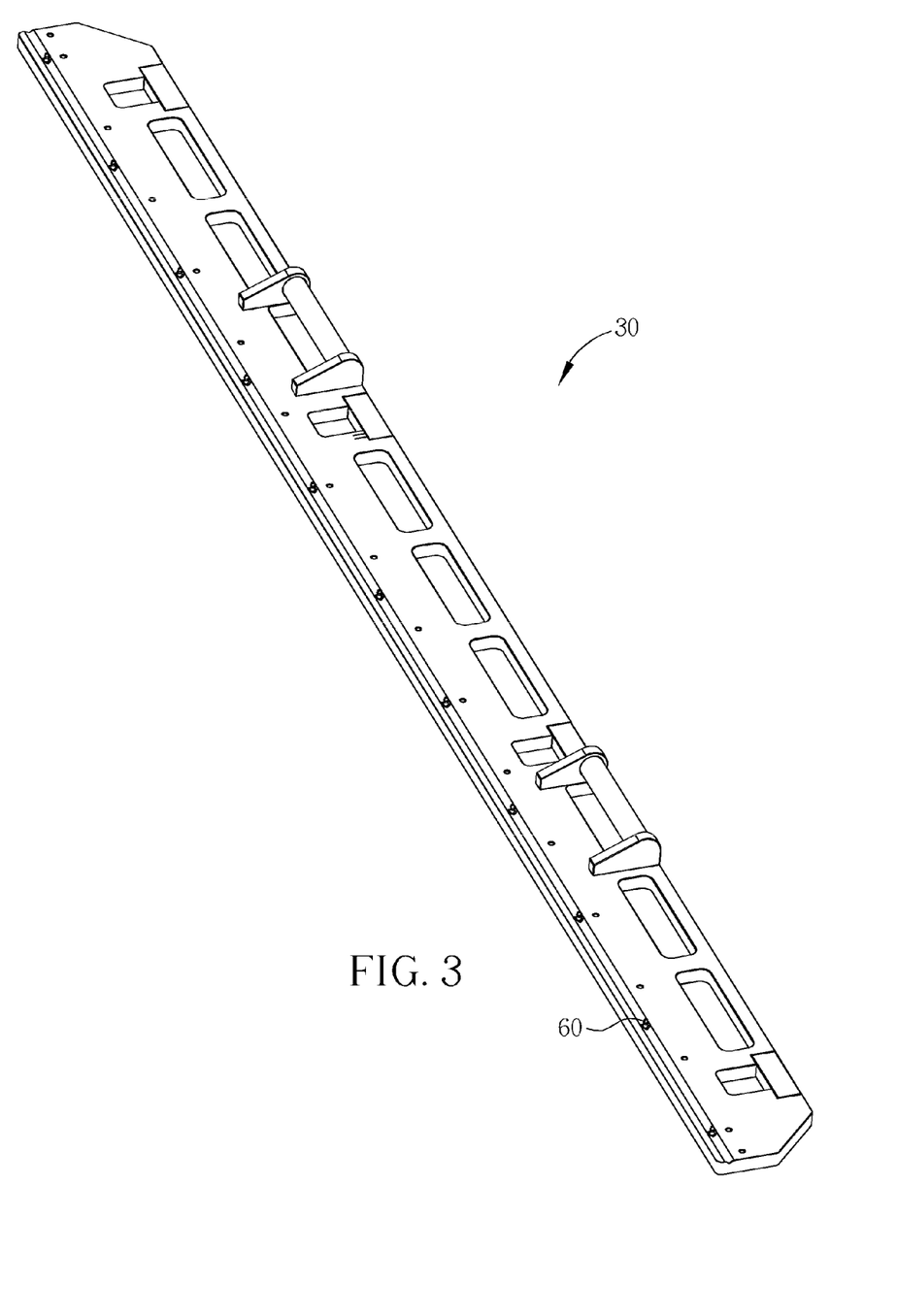
FIG. 3 is a schematic diagram of the first holder assembled with positioning elements.
Figure 4:
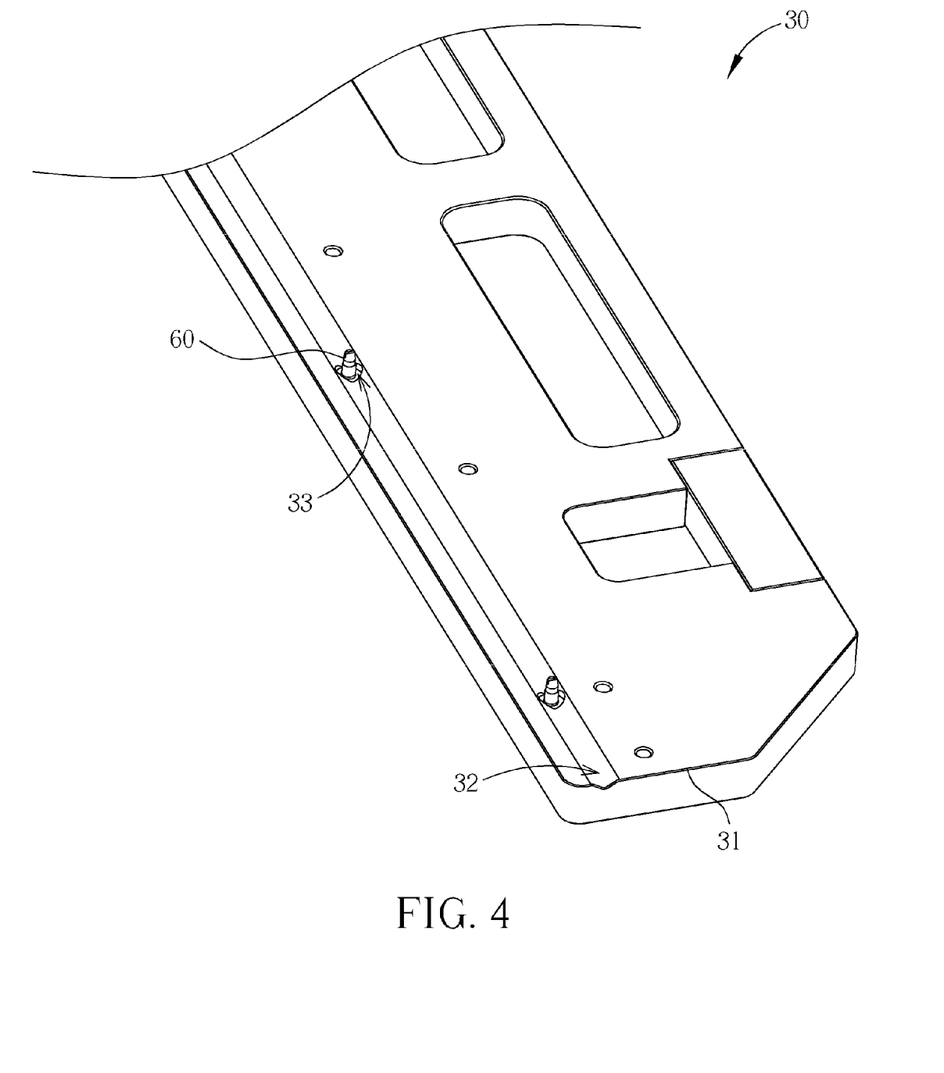
FIG. 4 is a schematic diagram showing a partially enlarged view of the first holder in FIG. 3.

Please refer to FIG. 3 and FIG. 4. FIG. 3 is a schematic diagram of the first holder 30 assembled with positioning elements 60, and FIG. 4 is a schematic diagram showing a partially enlarged view of the first holder 30 in FIG. 3. As shown in the figures, the first holder 30 includes a first clamping surface 31, which is a smooth flat surface, a strip-shaped groove 32 locating at the first clamping surface 31, and a plurality of positioning indentations 33 locating at the groove 32. The APR plate device 100 further includes the plurality of positioning elements 60, each mounted to a corresponding one of the positioning indentations 33 and protruding out of the groove 32. In this embodiment, the positioning elements 60 may be pins such as the screws that are screwed to the positioning indentations 33.

Figure 5:
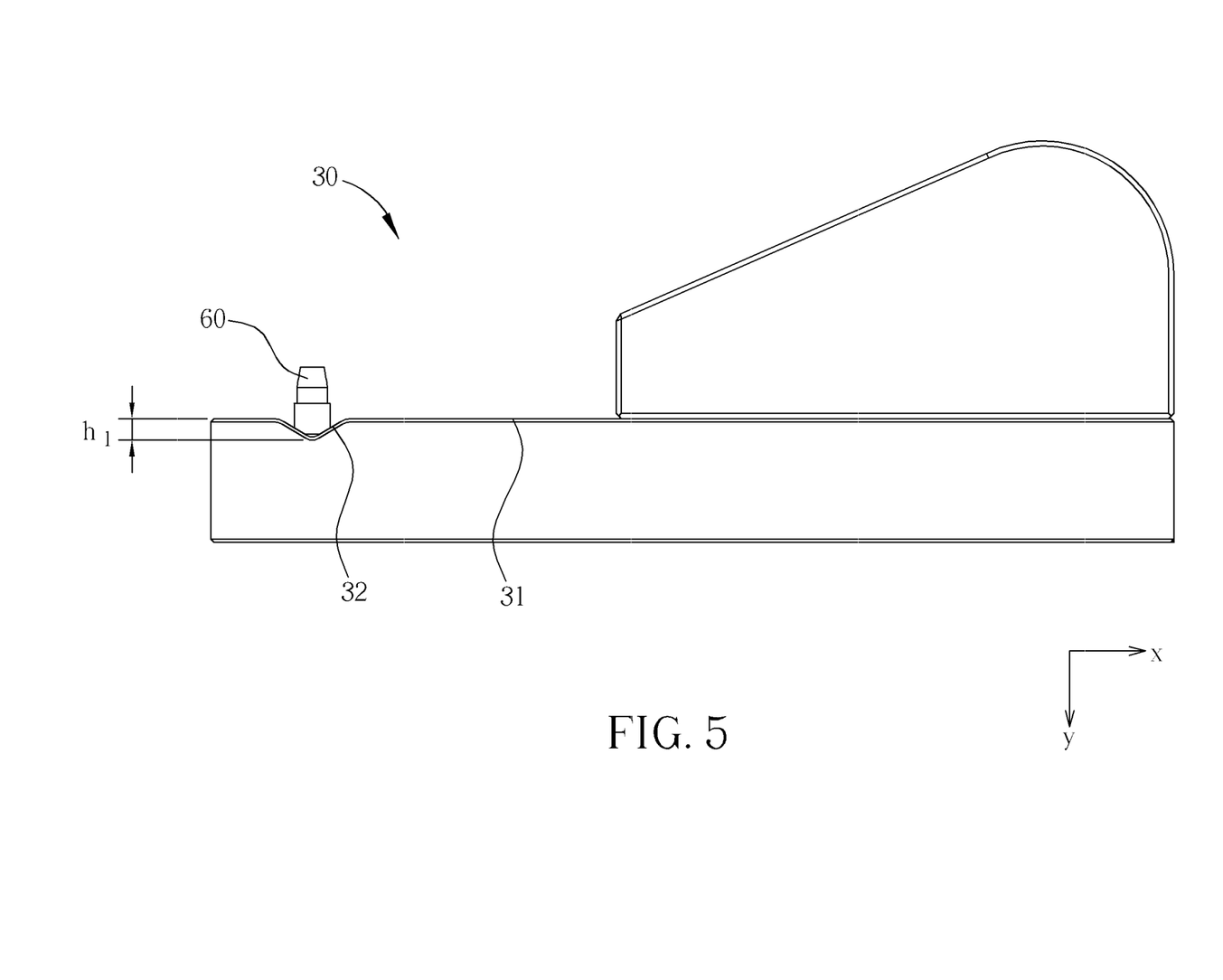
FIG. 5 is a schematic diagram of a lateral cross-sectional view of the first holder and the positioning element in FIG. 4.
Figure 6:
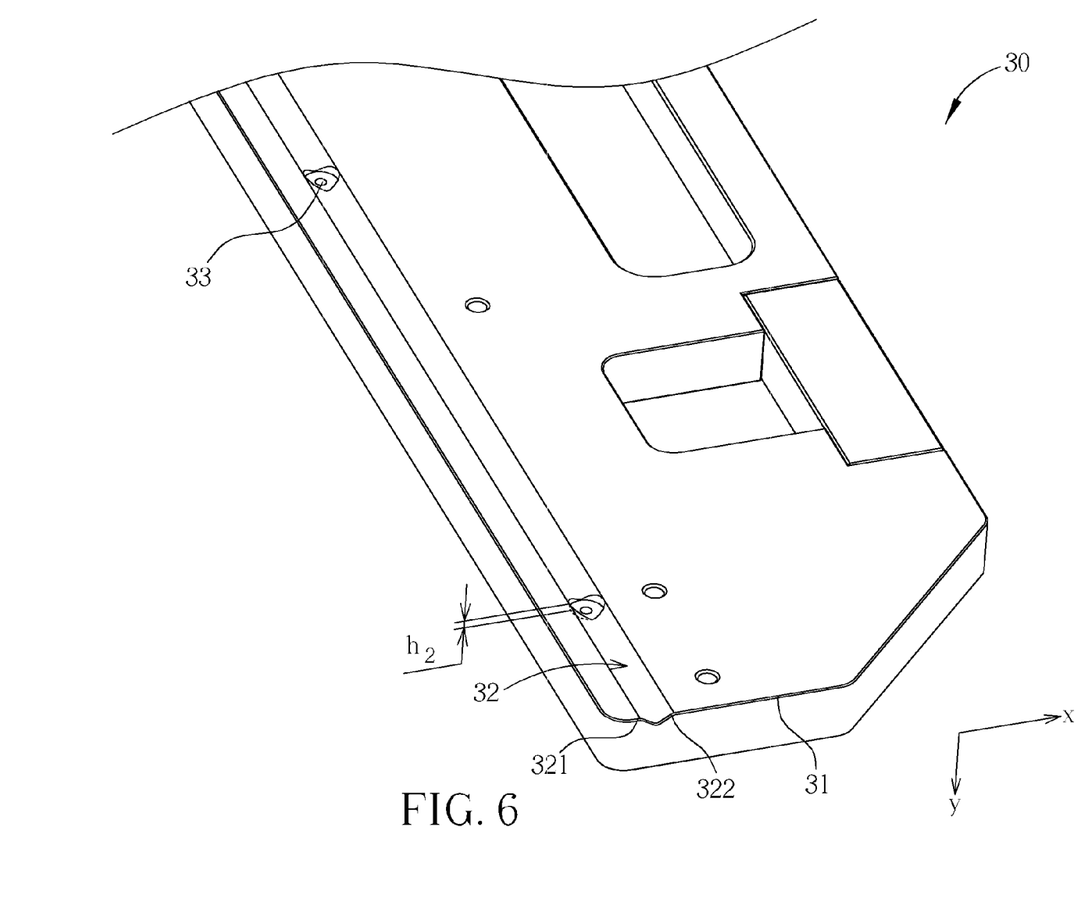
FIG. 6 is a schematic diagram showing a partially enlarged view of the first holder.
Figure 7:
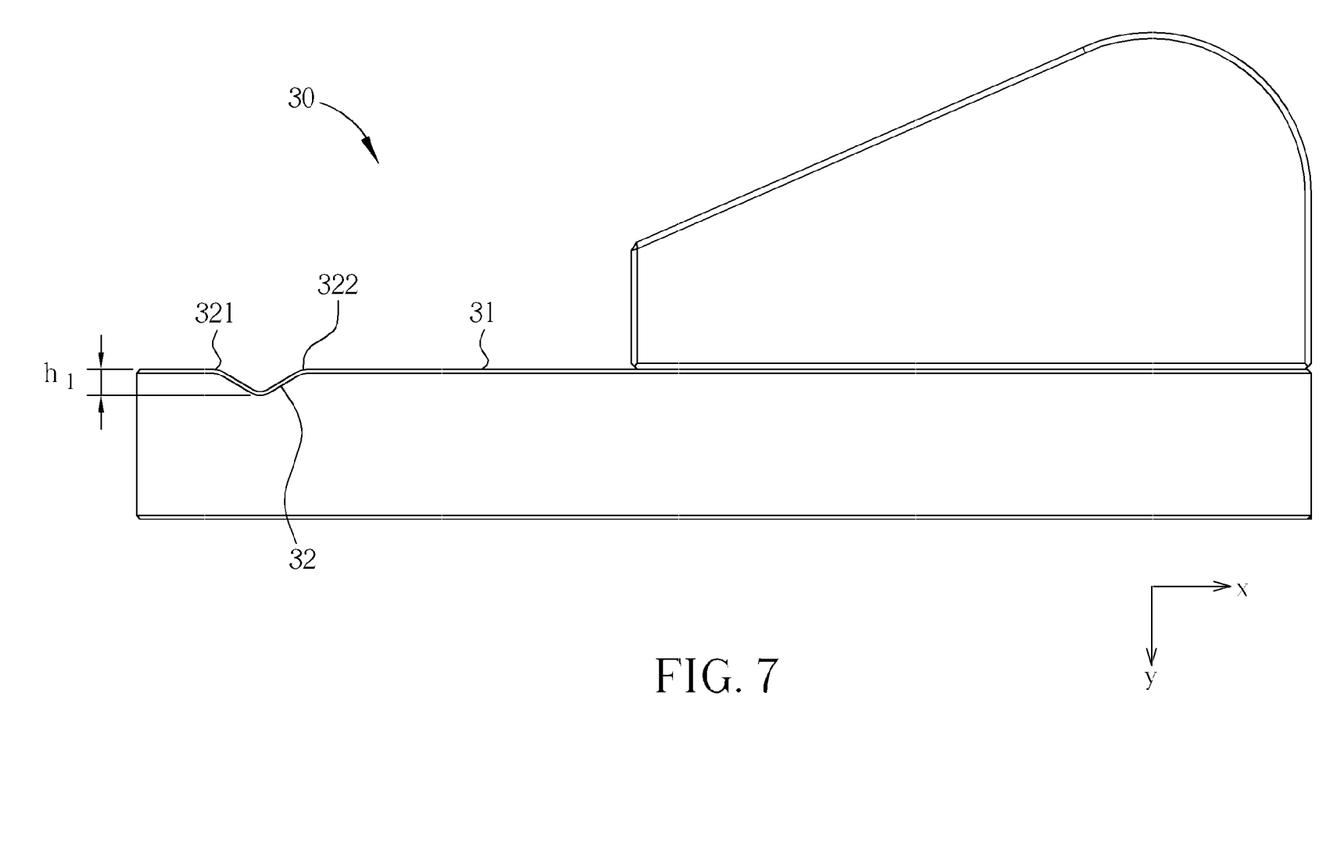
FIG. 7 is a lateral cross-sectional view of the first holder in FIG. 6.

Please refer to FIG. 5, FIG. 6, and FIG. 7. FIG. 5 is a schematic diagram of a lateral cross-sectional view of the first holder 30 and the positioning element 60 in FIG. 4, FIG. 6 is a schematic diagram showing a partially enlarged view of the first holder 30, and FIG. 7 is a lateral cross-sectional view of the first holder 30 in FIG. 6. In this embodiment, the groove 32 is a V-shape groove with arc type chamferings 321, 322 at both sides. The groove 32 is also with a depth $h_1$. In other embodiments, the lateral cross-section of the groove 32 may also be of other applicable contour such as a trapezoidal shape, arc shape, etc., and should not be limited by the embodiment shown in the figures. In FIG. 6, the positioning indentations 33 that are used for fixing the positioning elements 60 are with a depth $h_2$, which is slightly larger than the depth $h_1$ of the V-shape groove 32 so as to provide room for the APR plate when pressed by the holders 30, 40.

Figure 8:
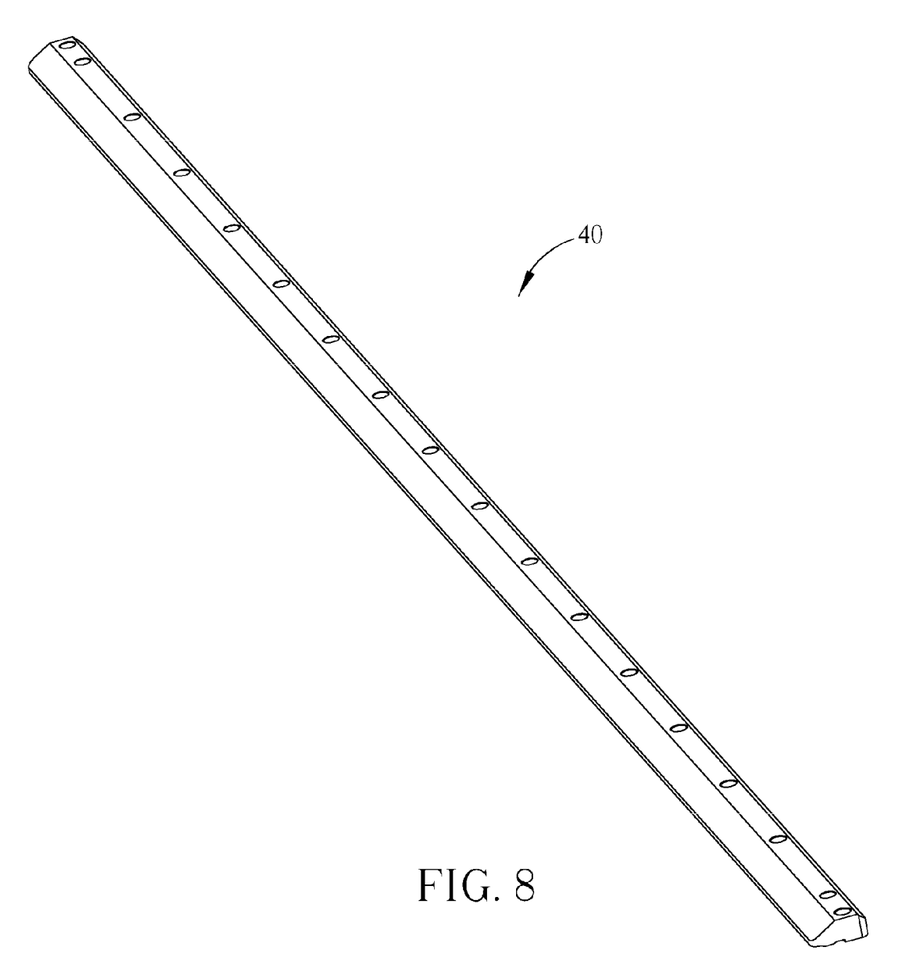
FIG. 8 is a schematic diagram of the second holder
Figure 9:
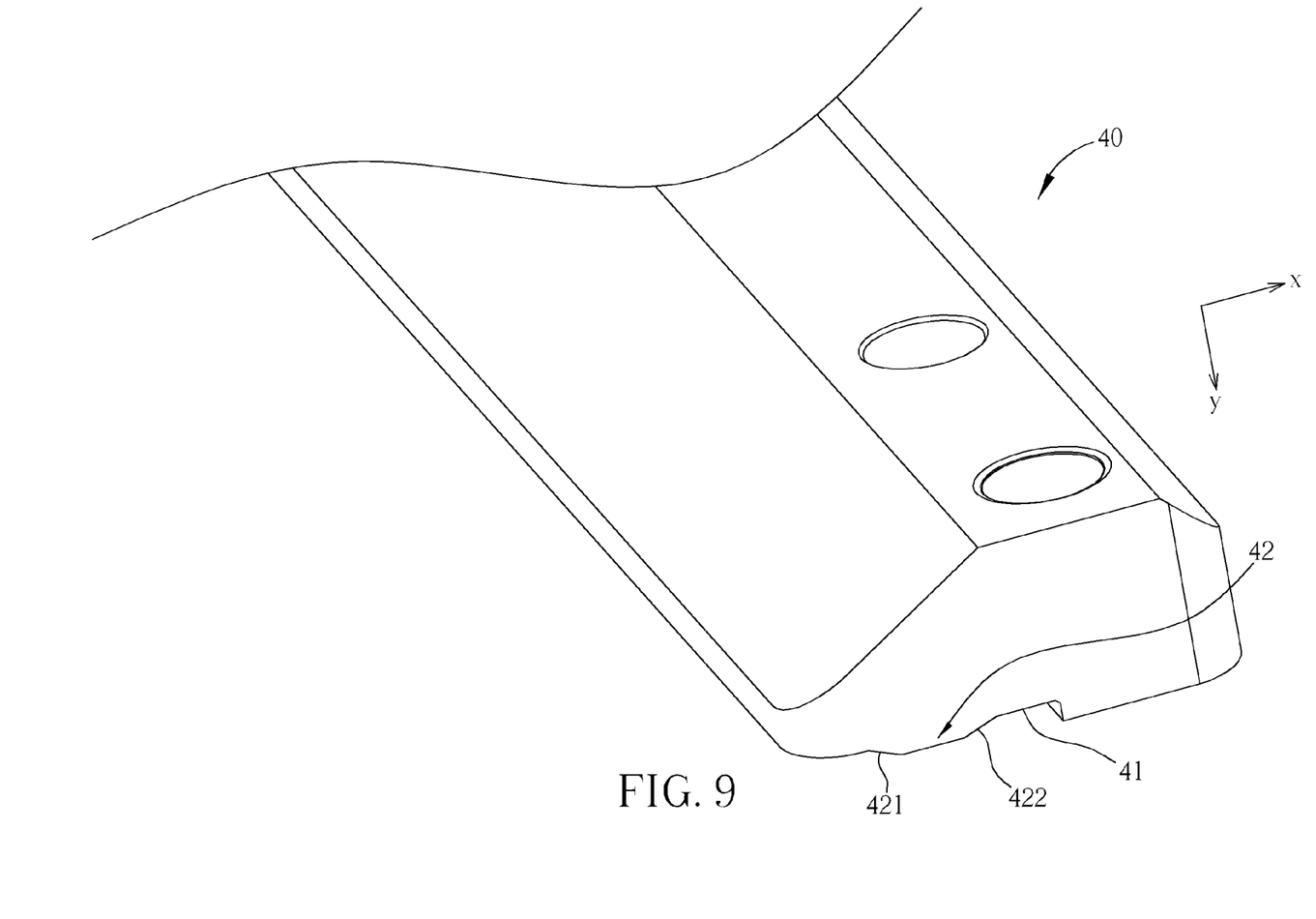
FIG. 9 is a schematic diagram showing a partially enlarged view of the second holder in FIG. 8.
Figure 10:
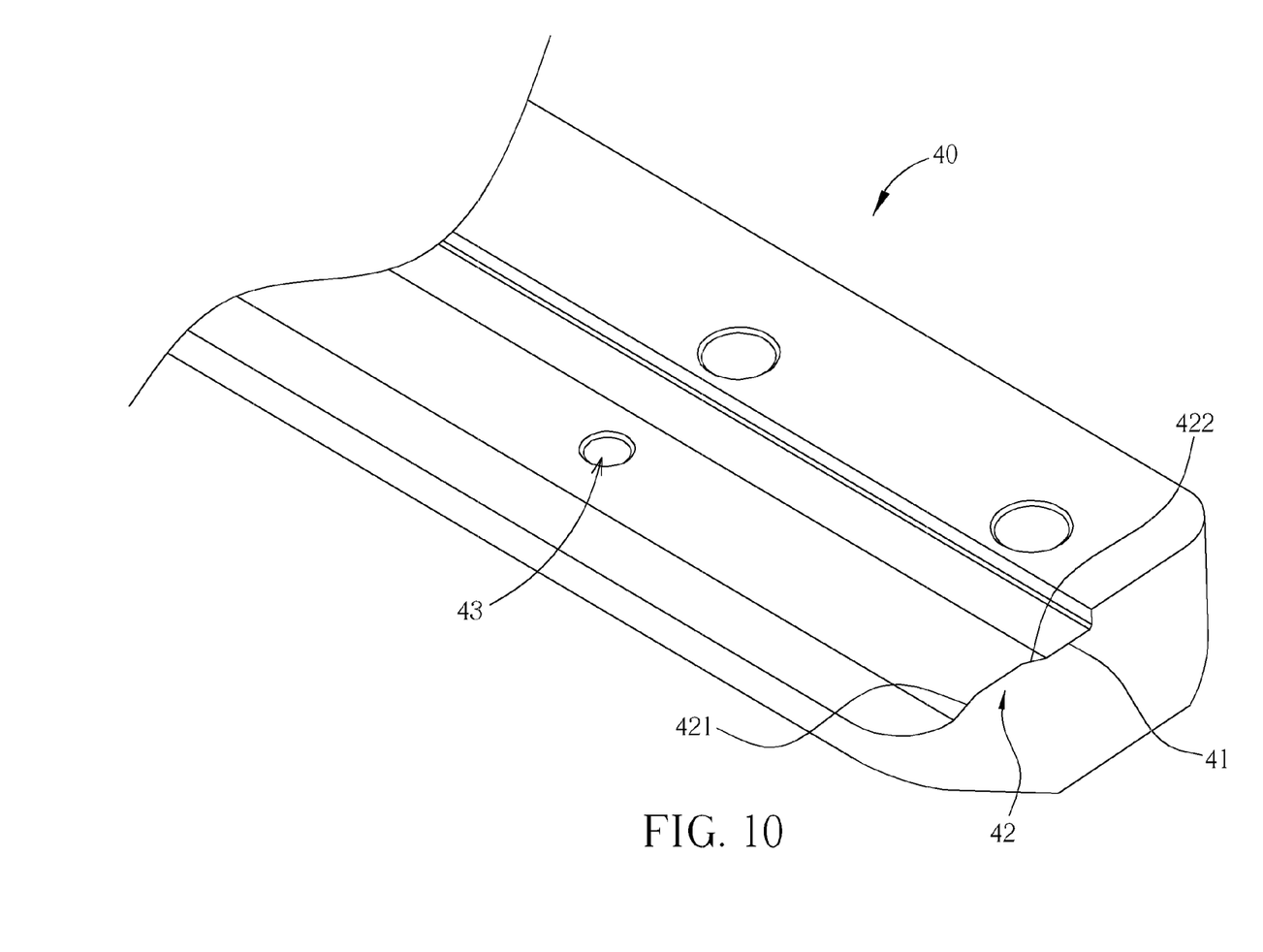
FIG. 10 is a schematic diagram of the second holder in another perspective view.
Figure 11:
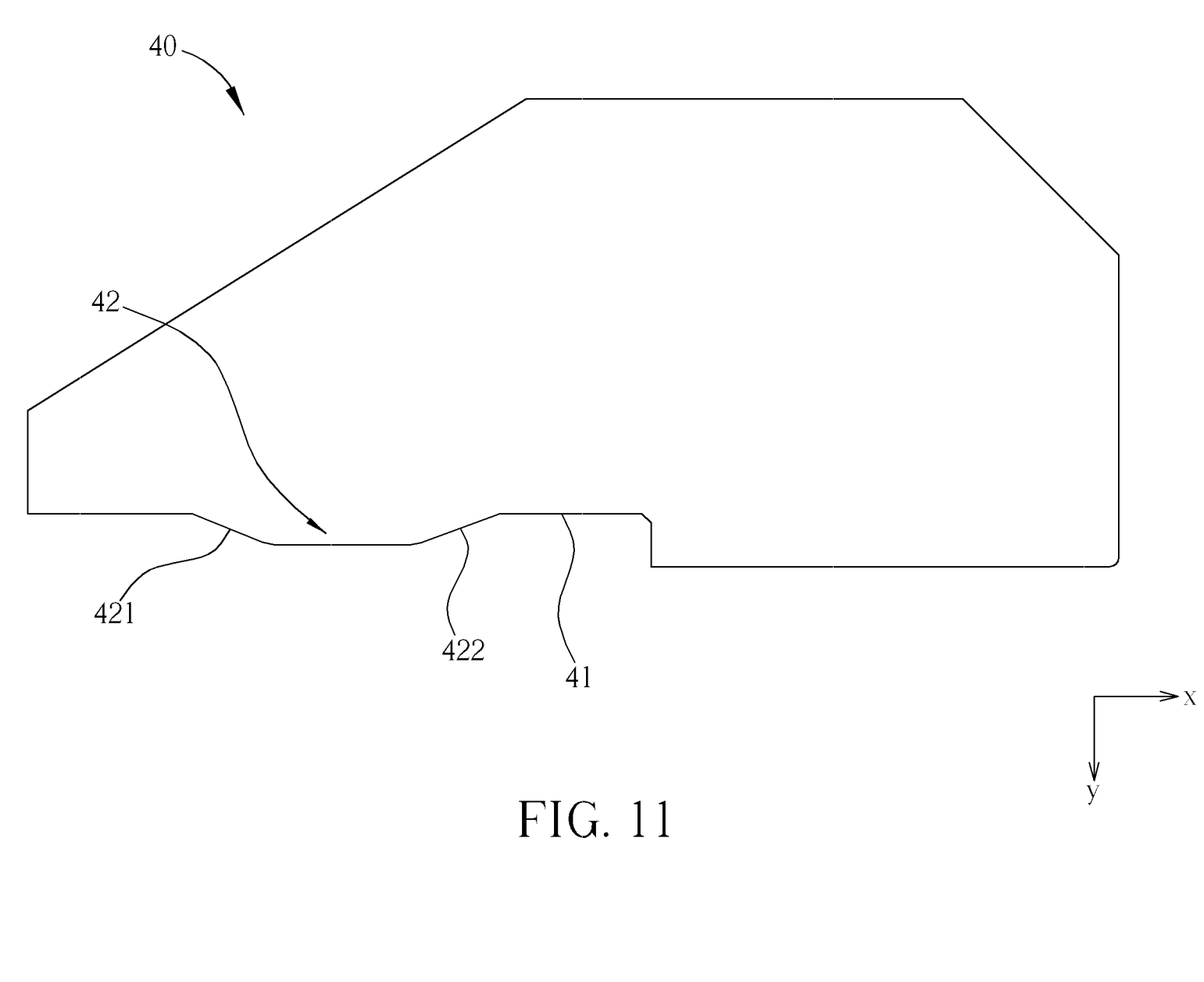
FIG. 11 is a schematic diagram showing a lateral cross-sectional view of the second holder in FIG. 9.

Please refer to FIG. 8~FIG. 11. FIG. 8 is a schematic diagram of the second holder 40, FIG. 9 is a schematic diagram showing a partially enlarged view of the second holder 40, FIG. 10 is a schematic diagram of the second holder 40 in another perspective view, and FIG. 11 is a schematic diagram showing a lateral cross-sectional view of the second holder 40. The second holder 40, which is used for assembling with the first holder 30, includes a second clamping surface 41, which is also a smooth flat surface, a strip-shaped protrusion 42 protruding from the second clamping surface 41 along direction y. The protrusion 42 has a plurality of buffers 43, which are indented circular holes. The protrusion 42 also has arc type chamferings 421, 422 at both sides. In this embodiment, the lateral cross-section of the protrusion 42 is trapezoidal shape or a resemblance matching with the groove 32, while it may also be of other applicable contour such as a V shape, arc shape, etc., and should not be limited by the embodiment shown in the figures.

Figure 12:
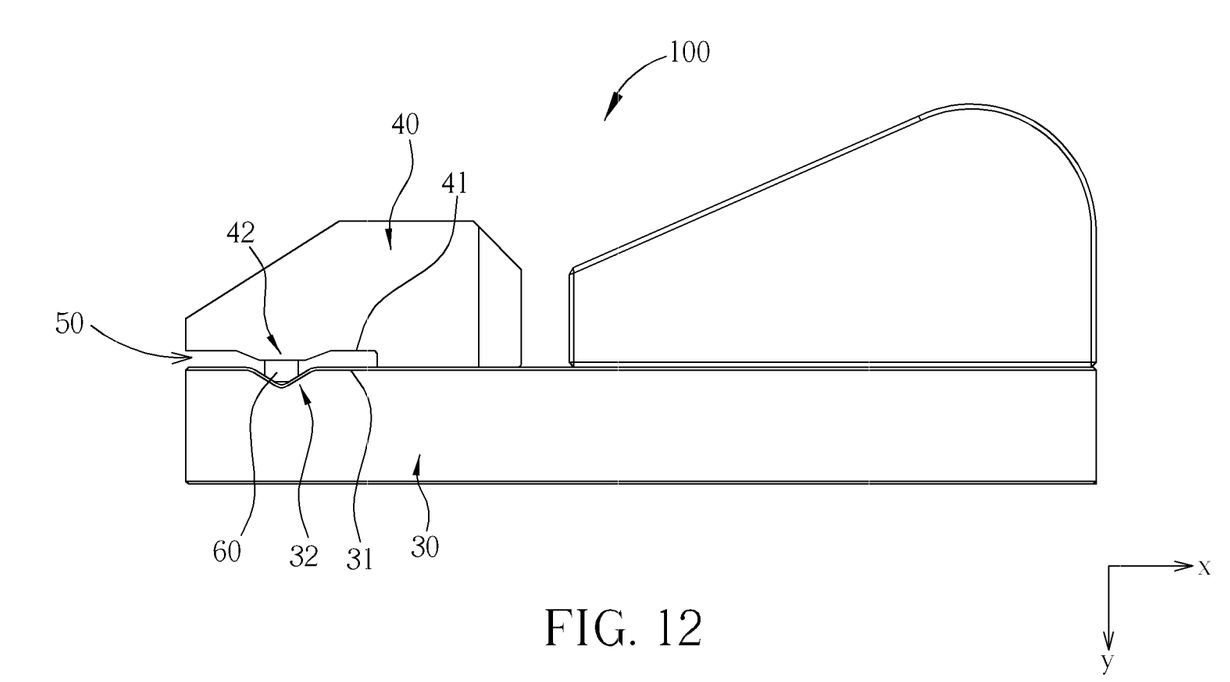
FIG. 12 is a schematic diagram of a lateral cross-sectional view of the first holder assembling with the second holder in FIG. 2.

Please refer to FIG. 12, which is a schematic diagram of a lateral cross-sectional view of the first holder 30 assembling with the second holder 40. As the first holder 30 assembles with the second holder 40 and the gap 50 is formed therebetween, the protrusion 42 of the second holder 40 corresponds to the groove 32 of the first holder 30 and extends toward the groove 32 along direction y. The indented shape of the groove 32 together with the downward extension of the protrusion 42 make the gap 50 formed by the two holders 30, 40 curved orientation towards direction y between the protrusion 42 and the groove 32. As the holders 30, 40 are clamping the end of the APR plate, such orientation can slightly deform the end of the APR plate and enhance the clamping ability of the holders 30, 40. When the first holder 30 assembles with the second holder 40, the plurality of buffers 43 at the protrusion 42 of the second holder 40 correspond to the plurality of positioning indentations 33 of the groove 32 respectively, referring to FIG. 4 and FIG. 10, such that each positioning element 60 at the positioning indentations 33 may extend to each corresponding buffer 43 but not abut against the protrusion 42 of the second holder 40. The buffers 43 provide gaps between each positioning element 60 and the protrusion 42.

Figure 13:
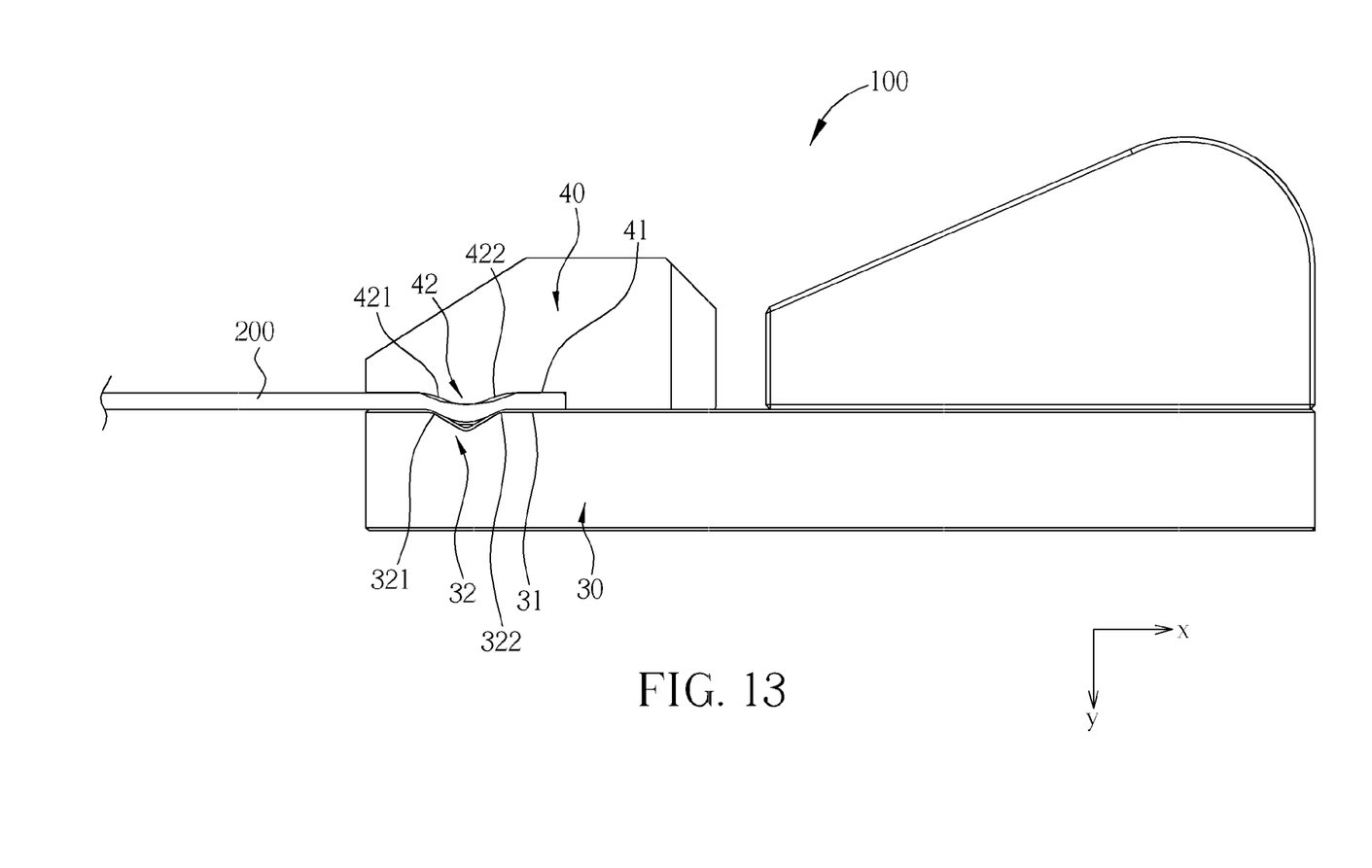
FIG. 13 is a schematic diagram of the APR plate device clamping an APR plate according to the invention.

Please refer to FIG. 13. FIG. 13 is a schematic diagram of the APR plate device 100 clamping an APR plate 200 according to the invention. Since an end of the APR plate 200 includes some positioning openings, not shown in the figure, that correspond to each positioning elements 60 respectively, the APR plate 200 is installed to the first holder 30, the positioning elements 60 being mounted as shown in FIG. 4, by matching each positioning opening to each positioning element 60. The second holder 40 is then assembled with the first holder 30. In such way, an end of the APR plate 200 extends along the x axis toward the gap 50 formed between the first holder 30 and the second holder 40 and both sides of the end of the APR plate 200 are clamped by the first clamping surface 31 and the second clamping surface 41 so that the APR plate 200 may be clamped. Since the protrusion 42 of the second holder 40 also extends along the y axis toward the groove 32 of the first holder 30, the protrusion 42, preferably the y axis being perpendicular to the x axis, will abut against the APR plate 200 and deform the end of the APR plate 200. The deformed section of the APR plate 200 may be accommodated by the groove 32. With the cooperation of the protrusion 42 and the groove 32, the APR plate 200 will be tightly clamped and not be stretched to buckle or tear by its own weight or the pulling force from a roller, or even the cracking of the positioning openings where the positioning elements 60 are pass through due to stress concentration. Additionally, the arc type chamferings 321, 322, 421, 422 at both sides of the protrusion 42 and the groove 32 may further provide smooth support for the deformed section of the APR plate 200 that will eliminate unexpected stress concentration at the deformed section of the APR plate 200.

Although the groove 32 and the positioning indentations 33 are disposed at the first holder 30 (the lower holder), and the protrusion 42 and the buffers 43 are disposed at the second holder 40 (the upper holder) in the aforementioned embodiments, the disposition of the protrusion 42 and the buffers 43 may also be altered to be located at the first holder 30, while the corresponding groove 32 and the positioning indentations 33 are located at the second holder 40, the positioning elements 60 mounted to the second holder 40. To put it further, in an APR plate device, using the groove and the protrusion between the first holder and the second holder to form a mechanism that can slightly abut against and deform an end of the APR plate along the y axis falls with the scope of the invention.

The APR plate device disclosed in the embodiments of the invention includes the protrusion and the corresponding groove respectively configured at the first holder and the second holder, such that as the APR plate is clamped by the first holder and the second holder via their clamping surfaces, the protrusion and the groove further push and slightly deform the APR plate for enhancement of the clamping toward the APR plate, thereby preventing problems of buckling or tearing of the APR plate due to insufficient clamping force of the holders.

Those skilled in the art will readily observe that numerous modifications and alterations of the device and method may be made while retaining the teachings of the invention.

What is claimed is:

1. An APR plate device, comprising:
a first holder comprising a first clamping surface, a strip-shaped groove, and a plurality of positioning indentations, the strip-shaped groove locating at the first clamping surface, the plurality of positioning indentations locating at the strip-shaped groove;
a second holder, for assembling with the first holder and a gap formed therebetween, the second holder comprising a second clamping surface and a strip-shaped protrusion, which protrudes from the second clamping surface and corresponds to and extends toward the strip-shaped groove when the first holder and the second holder are assembled together; and
a plurality of positioning elements, each mounted to a corresponding one of the positioning indentations and protruding out of the strip-shaped groove;
wherein after the second holder is assembled with the first holder and the gap is formed therebetween, an end of an APR plate used to extend into the gap for being abutted and clamped with the end's two sides by the first clamping surface and the second clamping surface respectively, the strip-shaped protrusion utilized for abutting against and deforming the end of the APR plate to clamp the end of the APR plate along a direction of the extension of the strip-shaped protrusion, the end of the APR plate comprising a plurality of positioning holes for corresponding to the plurality of positioning elements respectively.

2. The APR plate device of claim 1, wherein the strip-shaped groove of the first holder has a first depth, the plurality of positioning indentations have a second depth, and the second depth is larger than the first depth.

3. The APR plate device of claim 1, wherein the strip-shaped groove has V-shape or trapezoidal lateral cross-section, the lateral cross-section of the strip-shaped protrusion matching to that of the strip-shaped groove.

4. The APR plate device of claim 1, wherein the strip-shaped protrusion comprises arc type chamfering at both sides.

5. The APR plate device of claim 1, wherein the strip-shaped groove comprises arc type chamfering at both sides.

6. The APR plate device of claim 1, wherein the strip-shaped protrusion further comprises a plurality of buffers, each corresponding to one of the plurality of positioning indentations respectively when the first holder is assembled with the second holder and providing gap between corresponding positioning element and the strip-shaped protrusion, the plurality of buffers being indented holes.

7. The APR plate device of claim 1, wherein the plurality of positioning elements are screws utilized for being screwed to the positioning indentations.

* * * * *